(12) United States Patent
Habermehl

(10) Patent No.: US 6,771,083 B1
(45) Date of Patent: Aug. 3, 2004

(54) POOLE-FRENKEL PIEZOCONDUCTIVE ELEMENT AND SENSOR

(75) Inventor: Scott D. Habermehl, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 113 days.

(21) Appl. No.: 10/101,450

(22) Filed: Mar. 19, 2002

(51) Int. Cl.[7] .................. G01R 31/00; G01R 31/08; G01R 29/22
(52) U.S. Cl. ..................... 324/727; 501/522
(58) Field of Search ................. 324/727, 501, 324/522

(56) References Cited

U.S. PATENT DOCUMENTS

| 4,343,993 A | * | 8/1982 | Binnig et al. | ............ 250/306 |
| 5,196,701 A | * | 3/1993 | Foster et al. | ............ 250/306 |
| 5,315,247 A | * | 5/1994 | Kaiser et al. | ............ 324/244 |
| 6,339,221 B1 | * | 1/2002 | Schubring et al. | ......... 250/338.3 |

OTHER PUBLICATIONS

"Characterization of Tantalum Oxynitride Thin Films as High–Temperature Strain Gauges," to Ayerdi et al., Sensors–and–Actuators–A (Physical)(Switzerland), vol. A46, No. 1–3, p. 218–21, Jan.–Feb. 1995.*

* cited by examiner

*Primary Examiner*—N. Le
*Assistant Examiner*—John Teresinski
(74) *Attorney, Agent, or Firm*—Brian W. Dodson; John P. Hohimer

(57) ABSTRACT

A new class of highly sensitive piezoconductive strain sensor elements and sensors has been invented. The new elements function under conditions such that electrical conductivity is dominated by Poole-Frenkel transport. A substantial piezoconductive effect appears in this regime, allowing the new sensors to exhibit sensitivity to applied strain as much as two orders of magnitude in excess of prior art sensors based on doped silicon.

21 Claims, 2 Drawing Sheets

POOLE-FRENKEL PIEZOCONDUCTIVE ELEMENT AND SENSOR

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to sensors, and in particular to a new class of electrical strain sensors.

BACKGROUND OF THE INVENTION

Most prior art electrical strain sensor elements are based upon piezoresistive materials in which the obstacles to charge transport change in magnitude with applied strain. Such materials commonly exhibit an essentially linear change in resistance with applied stress, and typically show little or no change in resistance with the magnitude of the electrical field applied to measure the resistance of the element.

There are many forms of piezoresistive sensors known n the prior art. The most common such sensors, commonly applied in strain gauges and pressure sensors, utilize doped polysilicon or crystalline silicon piezoresistive elements.

The sensitivity of a piezoresistive element to an applied strain can be expressed as the gauge factor, which is the fractional change in resistance per unit strain $\epsilon$, or $\Delta R/\epsilon R$. While metals typically exhibit gauge factors between 2 and 4, silicon piezoresistive elements commonly exhibit gauge factors having magnitude as large as 200.

The importance of having a large gauge factor in practical applications is a direct result of the small strains associated with commonplace stresses. The elastic limits of most materials appear at less than 0.01 strain, and are often additional orders of magnitude smaller.

For example, assume one desires to measure an applied pressure of 1 megapascal (roughly 150 pounds per square inch (psi)) with a resolution and accuracy of 1%. In typical metals and semiconductors, the corresponding strain is on the order of $10^{-5}$, the relevant modulus being on the order of 100 gigapascals. If the gauge factor is 3, a typical value for metallic strain gauges, one is faced with the challenge of measuring a change in resistance of $3 \times 10^{-5}$ with a resolution and accuracy of $3 \times 10^{-7}$ of the total resistance, which is a very difficult task. If the gauge factor is 100, a value more typical for doped silicon, the change in resistance is $10^{-4}$, and the resolution and accuracy required is $10^{-6}$, which are measurement goals still difficult, but more easily attained.

However, in many cases the change in resistance associated with measuring a desired level of stress is still smaller than designers are comfortable with, even with the large gauge factor of a silicon strain gauge. Designers often resort to strain gauges which incorporate mechanisms or structures whose function is to concentrate the stress from a large area upon a smaller piezoresistive element, thereby increasing the resulting strain, and the change in resistance for a given applied stress.

Such structures, however, commonly lack sufficient physical robustness for many applications. Also, application of large strains often increases the susceptibility of materials to chemical attack, hence limiting the environmental robustness of concentrator stress gauges. Further, the limited gauge factors which are attainable even using doped silicon piezoresistive elements render even stress gauges incorporating a stress concentrating structure insufficiently sensitive for many applications.

There therefore exists in the prior art need for an electrical strain element and sensor which are more sensitive than those of the prior art. An additional need is for more robust electrical strain sensors which still retain sufficient sensitivity for general application.

The present invention addresses the above needs by applying newly discovered physical phenomena to produce a new class of piezoconductive strain sensors.

An advantage of the new piezoconductive strain sensors is that gauge factors are attainable which are orders of magnitude larger than those of prior art piezoresistive strain sensors.

An additional advantage of the new piezoconductive strain sensors is that their physical and environmental robustness generally exceeds that of prior art piezoresistive strain sensors.

These and other advantages of the process of the present invention will become evident to those skilled in the art.

SUMMARY OF THE INVENTION

A new class of electrical strain sensor has been invented, based upon the newly discovered strain dependence of Poole-Frenkel charge transport. A Poole-Frenkel piezoconductive strain sensor comprises a dielectric material containing carrier traps. An electric field is applied to this material to assist thermal excitation of charge carriers from the traps into the conduction band of the material. The depth of such traps is proportional to the mechanical strain applied to the dielectric material, so that the conductivity of the material, changes with the applied strain. Poole-Frenkel piezoconductive strain sensors exhibit sensitivity to applied strain as much as two orders of magnitude larger than do conventional piezoresistive strain sensors.

DETAILED DESCRIPTION

Figure 1:
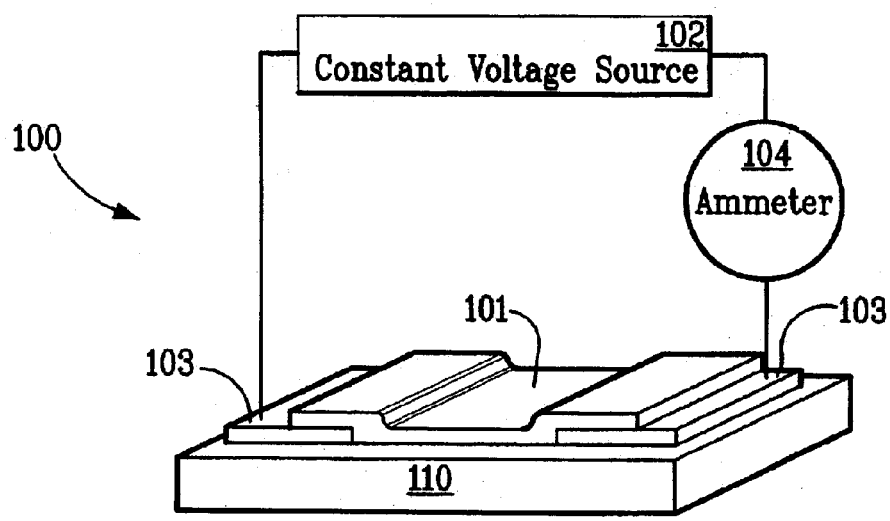
FIG. 1 shows a schematic drawing of a strip conductor configuration for a Poole-Frenkel piezoconductive sensor.

The present invention utilizes newly discovered properties of materials subjected to conditions in which electronic conduction is dominated by Poole-Frenkel transport. In Poole-Frenkel transport, electrons are thermally excited from traps into the conduction band of a dielectric material. The depths of said traps are reduced for transport opposite to the vector of an applied electric field. As a result, proper application of an electric field produces field-assisted thermally excited hopping conduction.

Note that, although the common terminology in the art area refers to the height of the Poole-Frenkel barrier, the actual process is that electronic carriers are being thermally excited out of the carrier traps, and the 'Poole-Frenkel barrier height' is actually the effective depth of said carrier traps below the conduction band under the prevailing conditions.

For the purposes of this specification, a Poole-Frenkel material shall be taken as a dielectric material containing a sufficient density of charge carrier traps that, over some range of applied electric field and temperature, electrical transport in the material is dominated by Poole-Frenkel transport, that is, by field-assisted thermal excitation of electrons from traps into the conduction band.

Experiments by the inventor and coworkers have shown that the Poole-Frenkel trap depth is changed by mechanical strain in the Poole-Frenkel material. This experimental work has shown that in silicon-rich silicon nitride films the Poole-Frenkel trap depth is proportional to the strain. As the conductivity of the Poole-Frenkel material is an exponential function of the Poole-Frenkel trap depth, application of mechanical strain changes the conductivity of a Poole-Frenkel material.

In prior art piezoresistive strain sensor elements, the resistance of the element largely results from obstacles to electrical transport within the material of the element. Applied strain changes the magnitude of such obstacles to electronic transport, and hence changes the resistance of the element.

However, in the case of Poole-Frenkel transport, the action of the applied strain is to change the number of free carriers available for charge transport, a fundamentally different strain-response mechanism. We therefore refer to the strain-sensitivity of Poole-Frenkel transport as a piezoconductive effect, to distinguish it from common piezoresistive effects which form the basis for many prior art strain sensors.

A piezoconductive strain sensor is one based upon measuring the electrical conductivity of a piezoconductive element, wherein the number of electronic carriers available for charge transport changes in a known manner when said element is subjected to strain. More specifically, the piezoconductive element of an electrical strain sensor in which electronic transport is dominated by Poole-Frenkel transport will herein be called a Poole-Frenkel piezoconductive element, and the corresponding sensor will herein be called a Poole-Frenkel piezoconductive strain sensor.

Note that the applied electric field must be oriented so that it increases electrical conductivity along a sensor element current path. In practice, this condition is often achieved simply by functionally connecting a voltage source to opposite ends of a sensor element current path, said path comprising a Poole-Frenkel material. Such a sensor element current path is defined by the specific design of a sensor element, and is beneficially chosen so that the orientation of the applied electric field relative to the intended current path and the magnitude of the applied electric field are substantially constant within the Poole-Frenkel material.

A variety of Poole-Frenkel materials are known to exist. In particular, the inventor has studied the Poole-Frenkel behavior of a range of amorphous $SiN_x$ films deposited on a silicon substrate using low pressure chemical vapor deposition with dichlorosilane and ammonia precursors at a deposition temperature of 800–850° C.

At room temperature, it was found that the electrical conductivity of a $SiN_{0.54}$ film is dominated by Poole-Frenkel transport for applied electric fields between roughly $4 \times 10^7$ and $10^9$ volts per meter (V/m). Poole-Frenkel transport was found to dominate the conduction in a $SiN_{1.17}$ film for applied electric fields between $7 \times 10^7$ and $10^9$ V/m, and in a $Si_3N_4$ film for applied electric fields between $6 \times 10^8$ and $10^9$ V/m. (Fields larger than $10^9$ V/m were not studied). As deposited, the Poole-Frenkel trap depth $\Phi_B$ for the three films was 1.08 electron volts (eV) for the $Si_3N_4$ film, 0.69 eV for the $SiN_{1.17}$ film, and 0.55 eV for the $SiN_{0.54}$ film.

The Poole-Frenkel transport mechanism is thermally-activated release of charge carriers from carrier traps. Accordingly, the conductivity due to Poole-Frenkel transport varies with temperature. This was demonstrated in experiments on a $(Ba,Sr)TiO_3$ film grown using radio-frequency sputtering at 490° C. In the Poole-Frenkel regime, the electrical conductivity of the $(Ba,Sr)TiO_3$ film is roughly 140 times greater at 100° C. than at 25° C., reflecting the exponential dependence of thermal excitation upon temperature.

In the regime dominated by Poole-Frenkel transport, a Poole-Frenkel material exhibits electrical conductance G given approximately by the following proportionality relation, $$G(\Phi_B, E, T) = A \exp[-(q\Phi_B/kT) + (aE^{1/2}/kT)],$$

where A is a proportionality constant, q is the electronic charge, $\Phi_B$ is the Poole-Frenkel trap depth, k is Boltzmann's constant, T is the temperature, E is the magnitude of the electric field applied to the Poole-Frenkel material, and a is a screening parameter given by the following equation:

$$a = [q^3 \pi \epsilon_o \epsilon]^{1/2},$$

where $\epsilon_o$ is the vacuum permittivity, and $\epsilon$ is the relative permittivity of the Poole-Frenkel material. Relative permittivity, sometimes called 'dynamic permittivity', is associated with the detrapping frequency of the charge carriers, and generally lies between the static and optical dielectric constants of the material.

It is useful to examine the dependence of the conductance of a Poole-Frenkel piezoconductive element on changes in the applied electric field, temperature, and Poole-Frenkel trap depth. By taking the appropriate partial derivatives, one obtains the following dependencies:

$$\Delta G(\Phi_B)/G = -(q/kT)\Delta\Phi_B;$$

$$\Delta G(T)/G = [(-aE^{1/2} + q\Phi_B)/kT^2]\Delta T; \text{ and,}$$

$$\Delta G(E)/G = -a/(2E^{1/2}kT)\Delta E.$$

In each instance, the variables not proceeded by a delta remain fixed.

Unless otherwise stated, the remainder of the discussion of Poole-Frenkel piezoconductive elements will assume the use of $SiN_{0.54}$ as grown by the inventor by the method described above. Restricting the discussion to this particular Poole-Frenkel material is not intended to limit the scope of the invention, which can utilize any Poole-Frenkel material. For example, materials in the silicon oxynitride system with compositions roughly between $Si_3N_4$ and $SiO_{0.8}N_{0.8}$ exhibit a Poole-Frenkel regime, and hence can be utilized in the present invention.

The experiments described above find that, in $SiN_{0.54}$, the Poole-Frenkel trap depth (as-grown and in the small field limit) is 0.55 eV, and at room temperature (nominally 300 oK) and an applied electric field of $10^8$ volts per meter (V/m), the Poole-Frenkel conductivity is $5 \times 10^{-5}$ S/m (siemens per meter). (Note that this Poole-Frenkel conductivity is many orders of magnitude greater than that exhibited by silicon nitride in the small field limit.) The relative permittivity $\epsilon$ is measured as between 9.7 and 10.7 for this material.

Using the material parameters above, the dependence of the electrical conductance of a Poole-Frenkel piezoconductive element on changes in the other sensor parameters can be numerically estimated.

For $SiN_{0.54}$, the application of a tensile strain of 0.1% produces an increase in trap depth of roughly 0.07 eV. (A strain of 0.1% in $SiN_{0.54}$ corresponds roughly to a material stress of 140 MPa, or some 1400 atmospheres of pressure.) In $SiN_{0.54}$, then, the Poole-Frenkel trap depth can be approximately expressed as $\Phi_B=0.55-70\eta$, where $\eta$ is the strain applied to the material, and $\Phi_B$ is in electron volts. Sensor elements may require individual calibration to account for material variations.

The conductance of a Poole-Frenkel piezoconductive element depends exponentially on the Poole-Frenkel trap depth as $G \sim \exp[(aE^{1/2}-q\Phi_B)/kT]$. As described earlier, a tensile strain of 0.1% is observed to change the Poole-Frenkel trap depth from 0.55 eV to 0.62 eV. At an operating temperature of 300° K. and a fixed applied electric field of $10^8$ V/m, this change in trap depth decreases the conductance of the active Poole-Frenkel piezoconductive element by a factor of roughly 13.7.

The strain dependence of a piezoconductive sensor element can only be characterized globally by a fixed gauge factor if the resistance is proportional to the applied strain. Hence Poole-Frenkel piezoconductive elements cannot be globally characterized by a fixed gauge factor. However, under any specific set of operating conditions, it is possible to define an equivalent gauge factor, to evaluate the sensitivity of such a piezoconductive element.

In the above example, a tensile strain $\epsilon$ of 0.1% produces a decrease in element conductance of $\Delta G(\eta)/G=-13.7$. The corresponding equivalent gauge factor is $\Delta G(\eta)/\eta G$, which is $1.37 \times 10^4$, roughly two orders of magnitude greater than the gauge factor typical of silicon strain gauges.

The equivalent gauge factor for smaller applied strains is less than the above figure, but still substantial. Evaluation of the differential relationship shown earlier shows that an $SiN_{0.54}$ Poole-Frenkel piezoconductive element functioning at room temperature and with an applied electric field for which Poole-Frenkel transport dominates will exhibit an equivalent conductance gauge factor of roughly 2800 for small applied strains.

The conductance of a Poole-Frenkel piezoconductive element also varies with changes in the element temperature and the magnitude of the applied electric field. After substituting the fundamental parameters and the material-dependent parameters for $SiN_{0.54}$, and operating conditions of zero applied strain, 300° K., and an applied electric field of $10^8$ V/m, one finds $\Delta G(T)/G=0.009 \Delta T$; and, $\Delta G(E)/G=-9.3 \times 10^{-8} 66 \, E$.

Based on these two relations, one can define an equivalent temperature gauge factor $\Delta G/[G(\Delta T/T)]=2.7$, and an equivalent field gauge factor $\Delta G/[G(\Delta E/E)]=-9.3$.

Both the 'temperature' gauge factor and the 'field' gauge factor are orders of magnitude smaller than is the strain gauge factor in a $SiN_{0.54}$ Poole-Frenkel piezoconductive element. As a result, changes in conductance due to applied strain will dominate changes in conductance due to changes in applied electric field and temperature over a considerable range of operating conditions.

The electric field applied to a Poole-Frenkel piezoconductive element can easily be controlled and/or measured to better than 0.1% of the applied field. Accordingly, few practical applications of Poole-Frenkel piezoconductive elements will be limited by the sensitivity of such elements to changes in applied electric field.

The sensitivity of such elements to temperature changes, however, can present a more serious problem, as in many applications significant changes in temperature can be encountered during the measurement of an applied strain, or between such measurements.

One can compensate for temperature change at the strain sensor by including means to measure the temperature at the site of a Poole-Frenkel piezoconductive element, and then removing the temperature dependence using an appropriate algorithm based on the relations presented above. It is also possible to include means to maintain the Poole-Frenkel piezoconductive element at a given temperature during strain measurements.

A specific method of providing temperature compensation is to position an unstrained Poole-Frenkel piezoconductive element adjacent to the strain sensor, so the strain sensor and the unstrained element are at the same temperature. The temperature dependence of the strain measurement can be removed by mathematical analysis of the measured conductance of the strained sensor and the unstrained sensor. A third alternative will be described later in the context of a Poole-Frenkel piezoconductive sensor system operating in a constant conductance mode.

Figure 2:
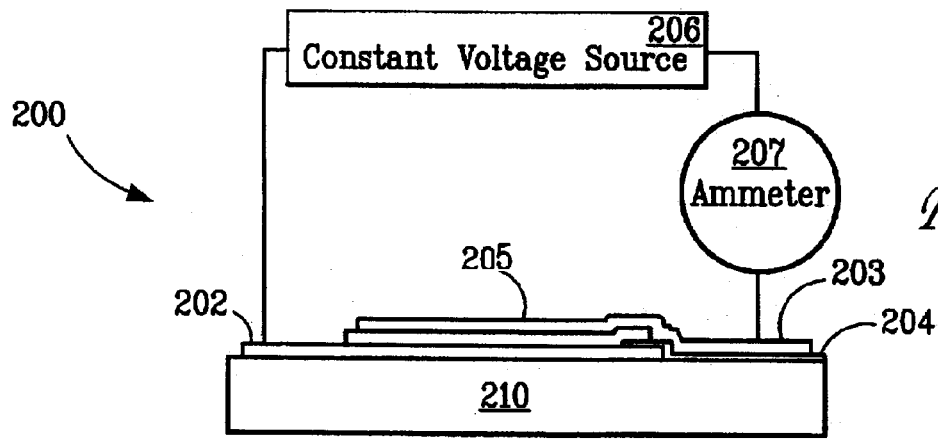
FIG. 2 shows a schematic drawing of a sandwich configuration for a Poole-Frenkel piezoconductive sensor.

Two general configurations for a Poole-Frenkel piezoconductive sensor are shown in FIGS. 1 and 2. The Poole-Frenkel piezoconductive elements are shown as thin films in these figures, but can take the form of bulk structures if desired.

A strip conductor configuration for a Poole-Frenkel piezoconductive sensor 100 is shown in FIG. 1. The applied electric field is directed along the length of Poole-Frenkel piezoconductive element 101, in this implementation by a constant voltage source 102 functionally connected to field electrodes 103 on a substrate 110. Ammeter 104 measures the current passing through element 101, and thereby allows the conductance of element 101 to be determined.

For purposes of evaluation of such a piezoconductive element, assume that the length of piezoconductive element 101 is 100 microns, the width is 1000 microns, and the thickness is 1 micron. Recall that if element 101 is composed primarily of $SiN_{0.54}$, and the applied electric field is $10^8$ V/m, the conductivity G of element 101 is $5 \times 10^{-5}$ S/m under the zero applied strain condition.

Since the conductance G of element 101 is equal to the cross-sectional area of element 101 times the conductivity of element 101 divided by the length of element 101, $G=5 \times 10^{-10}$ siemens (S), a very small value. ($5 \times 10^{-10}$ S is a resistance of $2 \times 10^9$ ohms.) Under the operating conditions chosen for this evaluation, the voltage applied to element 101 by constant voltage source 101 is $10^4$ volts, a value large enough to cause concerns about arcing and other forms of electrical breakdown external to piezoconductive element 101 proper. The current passing through element 101 under these conditions is 4.5 microamperes, corresponding to a power dissipation in element 101 of 45 milliwatts, a rather large value for a microsensor.

FIG. 2 shows a sandwich configuration for a Poole-Frenkel piezoconductive sensor 200. Here, the Poole-Frenkel piezoconductive element 205 takes the form of a thin film disposed between a lower field electrode 202 and an upper field electrode 203 on a substrate 210. Upper field electrode 203 is insulated from lower field electrode 202 by insulating layer 204. Electrodes 202 and 203 are functionally connected to a constant voltage source 206, which generates the applied electric field in element 205. Ammeter 207 measures the current flowing through piezoconductive element 205, thereby allowing the resistance of element 205 to be determined.

Assume the thickness of element 205 is 0.05 micron, and the cross-section parallel to the substrate surface is 100 microns on a side. If element 205 is composed essentially of $SiN_{0.54}$, and the operating conditions are the same as those taken for the sensor of FIG. 1, the zero-strain conductance of element 205 is $10^{-5}$ siemens, and the voltage applied to element 205 by constant voltage source 206 is only 5 volts. The current passing through element 205 is 50 microamperes, corresponding to a power dissipation of 0.25 milliwatts. The operating characteristics of the sandwich configuration are preferable to those of the strip conductor configuration for many applications.

Regardless of the detailed configuration of a Poole-Frenkel piezoconductive element, it is necessary to measure the element conductance while a rather large electric field is simultaneously applied to said element. In the case of an element consisting essentially of $SiN_{0.54}$, the applied electric field must be roughly in the range of $4 \times 10^7$ to $10^9$ V/m at room temperature for Poole-Frenkel transport to dominate the total electrical conductivity.

Figure 3:
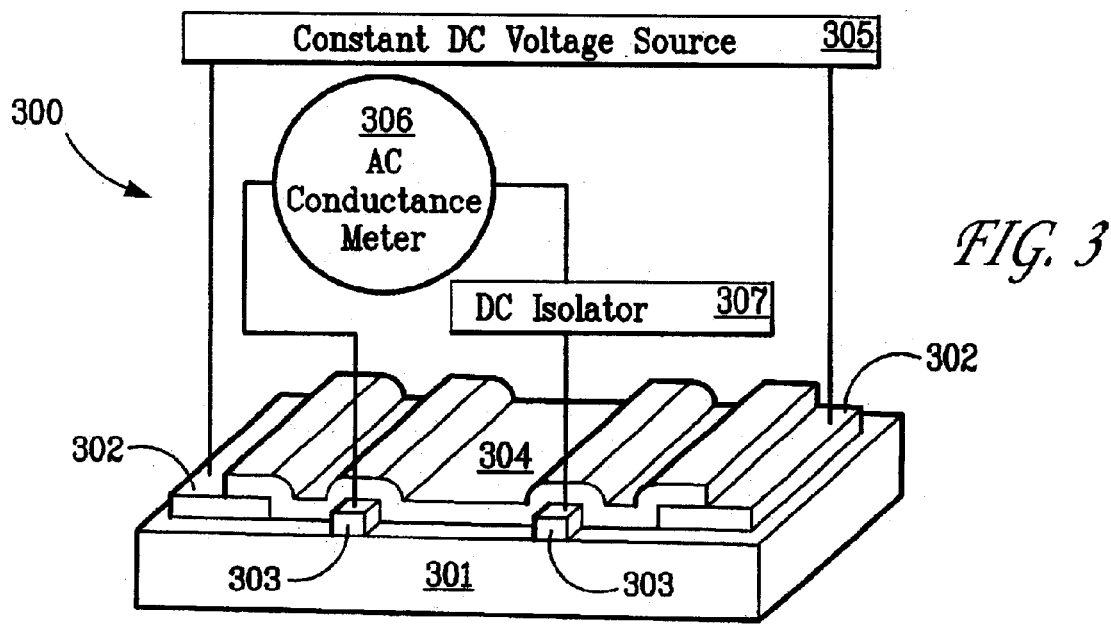
FIG. 3 shows a schematic drawing of a strip conductor configuration for a Poole-Frenkel piezoconductive sensor comprising an AC conductance measuring technique.

Many methods for measuring conductance under such conditions beside those shown in FIGS. 1 and 2 are known in the art. A specific implementation is shown in FIG. 3. This implementation can be useful in reducing the effects of electrical noise in measurement of the resistance of the Poole-Frenkel piezoconductive element.

In FIG. 3 appears a Poole-Frenkel piezoconductive sensor 300. DC field electrodes 302 and AC conductance electrodes 303 are disposed on a substrate 301. Poole-Frenkel piezoconductive element 304 is then disposed atop the surface of substrate 301, DC field electrodes 302, and AC conductance electrodes 303 so as to create a complete electrical path between element 304 and all the electrodes. The specific geometry of element 304 and electrodes 302 and 303 can vary from that shown in FIG. 3 as required to suit the particular application intended.

The source of the applied electric field which provides the field assist to thermally-excited carrier transport is constant DC voltage source 305, which is shown functionally connected to DC field electrodes 302.

An AC conductance meter 306 is then functionally connected to AC conductance electrodes 303 through DC isolator 307. AC conductance meter 306 adds an AC voltage of known magnitude to the DC voltage applied across element 304 by constant DC voltage source 305. The magnitude of the electric field attributable to said AC voltage is preferably small compared to that attributable to said DC voltage. AC conductance meter 306 then measures the AC component of the current passing through element 304, and obtains thereby the conductance of element 304 in the presence of the DC electric field.

AC conductance meter 306 is preferably connected to electrodes 303 through a DC isolator 307. The function of DC isolator 307 is to prevent AC conductance meter 306 from having to deal with the much larger DC component of the current passing through element 304. DC isolator 307 can comprise an in-line capacitor, a transformer, or many other suitable isolation components known in the art.

Note that AC conductance meter 306 can also function by applying an AC current of known magnitude across element 304, followed by measurement of the AC voltage. Other modes of operation for AC conductance meter 306, including a variety of bridge systems, are known in the art.

Figure 4:
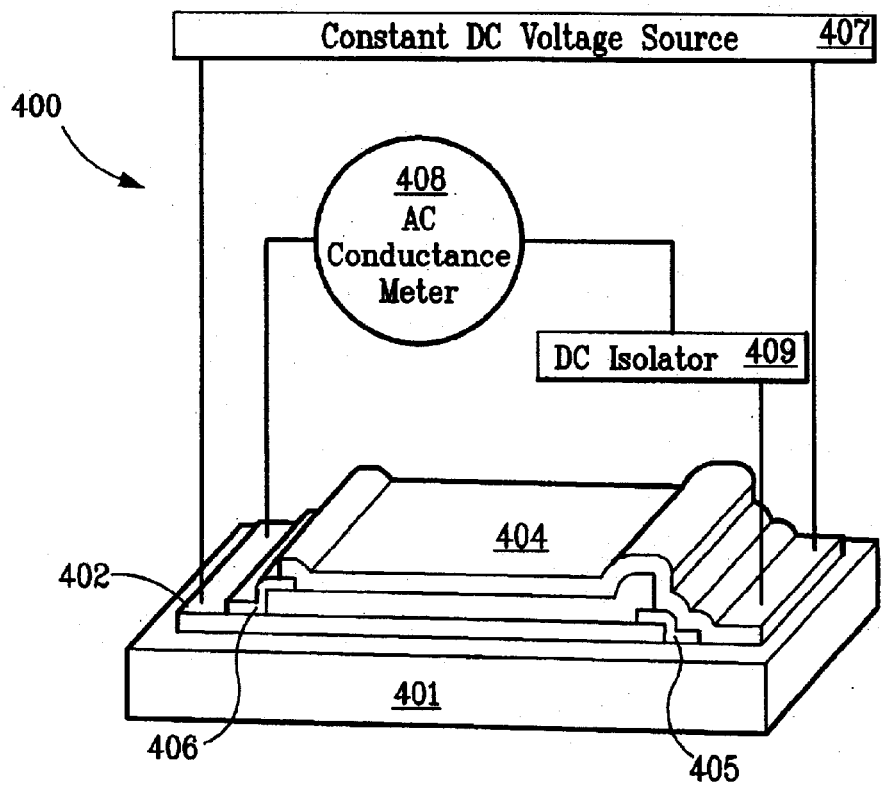
FIG. 4 shows a schematic drawing of a sandwich configuration for a Poole-Frenkel piezoconductive sensor comprising an AC conductance measuring technique.

AC techniques for measuring the conductance of a Poole-Frenkel piezoconductive element can also be applied to a sensor element with a sandwich structure, as shown in FIG. 4. Here Poole-Frenkel piezoconductive sensor 400 comprises a lower electrode 402 grown atop a substrate 401 and patterned as shown. First insulating layer 405 is grown atop electrode 402 and substrate 401, and patterned as shown. Poole-Frenkel piezoconductive element 403 is then grown and patterned as shown. Second insulating layer 406 is then grown and patterned as shown. Upper electrode 404 is then grown and patterned as shown.

In use, constant DC voltage source 407 is functionally connected to lower electrode 402 and upper electrode 404, thereby providing the DC field which is applied to assist thermally excited transport across element 403. AC conductance meter 408 is functionally connected through DC isolator 409 to lower electrode 402 and upper electrode 404, thereby measuring the conductance of Poole-Frenkel piezoconductive element 403.

A particularly beneficial mode of operation for a Poole-Frenkel piezoconductive sensor is the constant conductance mode. It was pointed out earlier that the conductivity of a Poole-Frenkel material is temperature dependent. While this temperature dependence is typically far less than the dependence on applied stress, applications having large fluctuations in temperature can pose a challenge, even if the temperature of the sensor element is measured in real time.

Recall that the conductance of a Poole-Frenkel piezoconductive element is given by the relationship $$G(\Phi_B,T,E)=A \exp[(q/kT)(-\Phi_B+aE^{1/2}/q)].$$

Substituting in the proportional relationship for the Poole-Frenkel trap depth, $\Phi_B(\eta)=\alpha+\beta\eta$, where $\eta$ is the element stress, one obtains:

$$G(\eta,T,E)=A \exp[(q/kT)(-\alpha-\beta\eta+aE^{1/2}/q)].$$

Select an initial set of operating parameters $\eta_o$ and $T_o$. Then choose the magnitude of the initial applied electric field $E_o$ so that the initial element conductance $G_o$ under the initial operating parameters is independent of temperature. (I.e., so that $aE_o^{1/2}=\alpha+\beta\eta_o$. If the relationship between trap depth and applied strain is uncertain, $E_o$ can be set in a calibration procedure during which temperature is changed.)

One can then express the element conductance $G(\eta,T,E)$ in terms of the initial element conductance $G_o$ as $$G(\eta,T,E)=G_o \exp[(q/kT)(-\alpha-\beta\eta+aE^{1/2})].$$

The element conductance above is still an exponential function of the element temperature. This dependence can be removed by adjusting the applied electric field E so that $G(\eta,T,E)=G_o$ under the other conditions extant. This condition can be written $$\eta(E)=(aE^{1/2}-\alpha)/\beta.$$

Apply this constant conductance measurement technique to a Poole-Frenkel piezoconductive sensor element consisting essentially of $SiN_{0.54}$. For this Poole-Frenkel material, $\alpha=8.8\times10^{-20}$ joules, $\beta=-1.12\times10^{-17}$ joules, and a is roughly $3.84\times10^{-24}$ in MKS units. If the initial strain $\eta_o$ is zero, then $E_o=[\alpha/a]^2=5.25\times10^8$ V/m.

Under these conditions, the range of applied fields under which Poole-Frenkel transport is dominant (roughly $4\times10^7$ V/m to $1\times10^9$ V/m for $SiN_{0.54}$) allows constant conductance measurement of additional strain applied to the sensor between +0.006 and −0.003, which corresponds roughly to stresses applied to the sensor on the order of −0.5 to +1 GPa, or on the order of 100000 psi in tension or compression.

If the Poole-Frenkel piezoconductive element in the constant conductance sensor described above has a dimension of 0.05 micron in the direction across which the electric field is applied, the magnitude of the DC voltage applied to the element to generate the applied electric field varies between 2 volts and 50 volts in operation.

The mean sensitivity of this element when operated under the constant conductivity conditions as described is roughly $\Delta V=10000\Delta\eta$. Thus, a easily measurable change in applied voltage of 1 millivolt corresponds roughly to a change in applied strain of $10^{-7}$, or a change in stress on the order of 1 psi. This level of sensitivity makes a Poole-Frenkel piezoconductive sensor operated in the constant conductance mode well suited to many conventional strain measurement applications.

The constant conductance measurement technique can be summarized as follows. Choose the initial applied electric field $E_o$ so that the initial element conductance does not depend on temperature, i.e., so that $aE_o^{1/2}=\alpha+\beta\eta_o$. When a measurement of applied strain is desired, adjust the A magnitude of the applied electric field E so that $G(\eta,T,E)=G_o$. The applied strain is then given by the expression $\eta(E)=(aE^{1/2}-\alpha)/\beta$. Use of this procedure substantially eliminates temperature dependence of the strain measurement.

Figure 5:
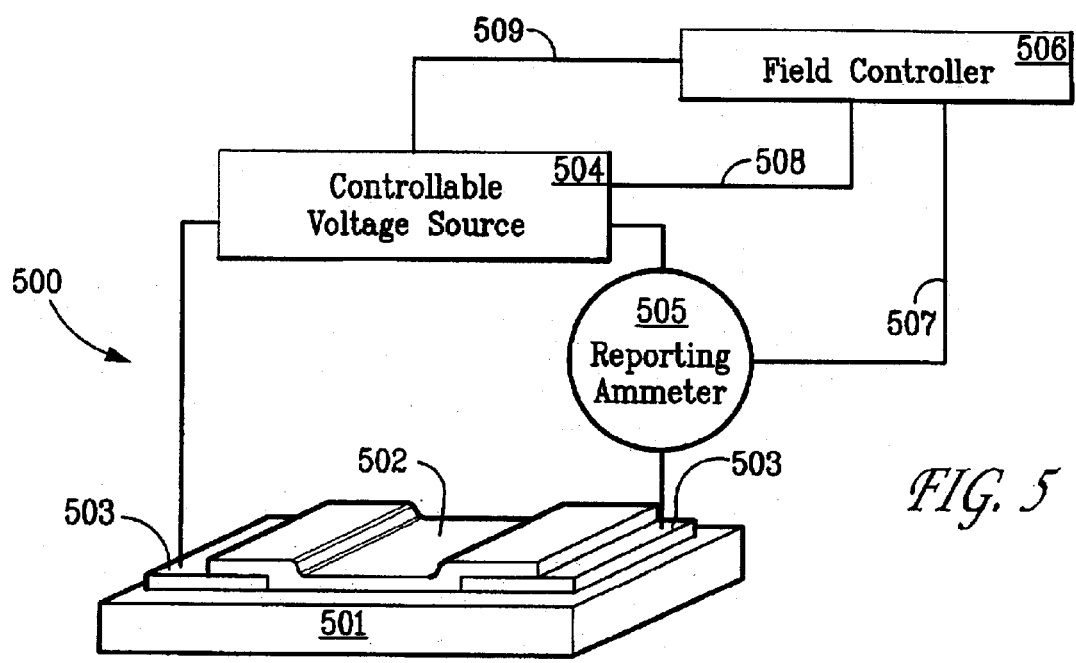
FIG. 5 shows a schematic drawing of a constant resistance Poole-Frenkel piezoconductive sensor.

A constant conductance Poole-Frenkel piezoconductive sensor 500 appears in FIG. 5. Here a pair of element electrodes 503 are grown atop a substrate 501, and a Poole-Frenkel piezoconductive element 502 is then grown. A controllable voltage source 504 is functionally connected to electrodes 503 so that reporting ammeter 505 can monitor the current passing through element 504.

In the constant conductance technique, it is necessary to adjust the electric field applied to element 504 so that the conductance of element 504 remains constant at a value pre-selected to display no temperature dependence. To make the necessary adjustments, the voltage supplied by controllable voltage source 504 is controlled by field controller 506. Field controller 506 receives a report of the present current passing through sensor element 503 from reporting ammeter 505 through current connection 507, and a report of the present voltage applied to sensor element 503 from controllable voltage source 504 through voltage connection 508.

Field controller 506 then calculates the conductance of sensor element 503, and calculates the voltage which needs to be applied to sensor element 503 to return the conductance of sensor element 503 to the pre-selected value. The controllable voltage source 504 is then instructed to provide this altered voltage through instruction connection 509. This feedback loop can be implemented as analog circuitry, digital circuitry, or hybrid circuitry, using means well known in the art.

If desired, both $E_o$ and the relationship for $\eta(E)$ can be found by experimental calibration procedures. Such procedures can also account for small variations from the predicted Poole-Frenkel transport behavior. It will be clear to one skilled in the art that a constant conductance Poole-Frenkel piezoconductive sensor can be fabricated using a number of sensor element geometries, specifically including the sandwich configuration described earlier.

The specific implementations of the present invention described above are intended only to illustrate various features of the present invention. The scope of the present invention is intended to be set by the claims in view of the specification.

What is claimed is:

1. A Poole-Frenkel piezoconductive strain sensor, comprising:
   a) a Poole-Frenkel piezoconductive sensor element, said element being effectively coupled to an applied strain, said element comprising a sensor element current path, said path comprising a Poole-Frenkel material and having a path electrical conductance;
   b) an electric field source functionally connected to said sensor element current path in the Poole-Frenkel material, such that the magnitude and orientation of said known electric field are chosen so that the path electrical conductance is dominated by Poole-Frenkel transport in the Poole-Frenkel material;
   c) conductance measuring means functionally connected to provide a measured value of said path electrical conductance; and
   d) data means to determine and report the value of the applied strain in useful form.

2. The strain sensor of claim 1, wherein the magnitude and orientation of said known electric field are essentially constant within said Poole-Frenkel material.

3. The strain sensor of claim 2, wherein the piezoconductive sensor element comprises two field electrodes and a Poole-Frenkel material in a strip configuration.

4. The strain sensor of claim 2, wherein the piezoconductive sensor element comprises two field electrodes and a Poole-Frenkel material in a sandwich configuration.

5. The strain sensor of claim 1, wherein the electric field source comprises a constant voltage source.

6. The strain sensor of claim 1, wherein the electric field source comprises a constant current source.

7. The strain sensor of claim 1, further comprising a feedback system which adjusts the magnitude of said known electric field so that said the measured value of said path electrical conductance remains at a preset value.

8. The strain sensor of claim 7, wherein said preset value is chosen to minimize the temperature dependence of the value of the applied strain.

9. The strains sensor of claim 1, wherein the conductance measuring means comprises a current meter so disposed as to measure electrical current conducted through the sensor element current path.

10. The strain sensor of claim 9, wherein the conductance measuring means further comprise a voltmeter so disposed as to measure the voltage drop along the sensor element current path.

11. The strain sensor of claim 1, wherein said data means further comprise inputs for the measured value of said path electrical conductance and the magnitude and orientation of the known electric field in the Poole-Frenkel material, and a data computer to calculate the value of the applied strain based on said inputs.

12. The strain sensor of claim 11, further comprising a sensor element thermometer to provide a measured value of sensor element temperature, and wherein said data means further comprise an input for said measured value of sensor element temperature.

13. The strain sensor of claim 12, wherein said sensor element thermometer comprises a thermometer element consisting essentially of the same Poole-Frenkel material which is used in the Poole-Frenkel piezoconductive sensor element, said thermometer element being so mounted that it does not respond to said applied strain, and also so that the temperature of said thermometer element is substantially that of the Poole-Frenkel piezoconductive sensor element.

14. The strain sensor of claim 1, wherein said Poole-Frenkel material consists essentially of a silicon oxynitride compound.

15. The strain sensor of claim 1, wherein said Poole-Frenkel material consists essentially of a silicon-nitrogen compound.

16. The strain sensor of claim 1, wherein said Poole-Frenkel material consists essentially of a silicon-rich silicon-nitrogen compound.

17. A sensor element comprising a Poole-Frenkel piezoconductive strain sensor element which further comprises a Poole-Frenkel material and two field electrodes attached to the Poole-Frenkel material at opposite sides thereof.

18. The sensor element of claim 17, wherein the Poole-Frenkel material consists essentially of a silicon oxynitride compound.

19. The sensor element of claim 17, wherein the Poole-Frenkel material consists essentially of a silicon-nitrogen compound.

20. The sensor element of claim 17, wherein the Poole-Frenkel material consists essentially of a silicon-rich silicon-nitrogen compound.

21. A method to measure an applied strain using a Poole-Frenkel piezoconductive strain sensor element, where said element comprises a sensor element current path, said path comprises a Poole-Frenkel material and said path has a path electrical conductance, said method comprising the steps:

a) applying a path voltage with an initial value to said sensor element current path, thereby generating an electrical field with an initial field magnitude within said Poole-Frenkel material, the initial field magnitude being chosen so that the path electrical conductance is dominated by Poole-Frenkel transport in the Poole-Frenkel material, and further so that the initial value of the path electrical conductance is substantially independent of temperature;

b) effectively coupling an applied strain to the Poole-Frenkel strain sensor element;

c) changing said path voltage so that the value of the path electrical conductance in the presence of said applied strain is equal to the initial value of the path electrical conductance; and d) generating a strain output usefully related to the value of the applied strain.

\* \* \* \* \*